United States Patent [19]

Miller

[11] Patent Number: 6,022,566
[45] Date of Patent: Feb. 8, 2000

[54] METHOD FOR INCREASING THE FEED INTAKE, FEED EFFICIENCY, DAILY GAIN AND/OR CARCASS GRADE IN RUMINANTS

[75] Inventor: Bryan G. Miller, Pine Bush, N.Y.

[73] Assignee: Balchem Corporation, Slate Hill, N.Y.

[21] Appl. No.: 09/201,772

[22] Filed: Dec. 1, 1998

Related U.S. Application Data

[60] Provisional application No. 60/067,329, Dec. 2, 1997.

[51] Int. Cl.[7] ........................................ A23K 1/00
[52] U.S. Cl. .................. 426/2; 426/96; 426/648; 426/807
[58] Field of Search ............. 426/2, 807, 648, 426/96

[56] References Cited

U.S. PATENT DOCUMENTS

| | | | |
|---|---|---|---|
| 2,970,911 | 2/1961 | Lorz | 99/2 |
| 3,475,177 | 10/1969 | Jones | 99/2 |
| 4,225,620 | 9/1980 | Rawlings et al. | 426/2 |
| 4,394,377 | 7/1983 | Spires | 424/177 |
| 4,713,245 | 12/1987 | Ando et al. | 424/438 |
| 4,876,097 | 10/1989 | Autant et al. | 426/74 |
| 4,976,976 | 12/1990 | Itagaki et al. | 426/69 |
| 4,983,403 | 1/1991 | Ardaillon et al. | 426/2 |
| 4,996,067 | 2/1991 | Kobayashi et al. | 426/96 |
| 5,080,917 | 1/1992 | Itoh et al. | 426/96 |
| 5,182,126 | 1/1993 | Vinci et al. | 426/74 |
| 5,190,775 | 3/1993 | Klose | 426/2 |
| 5,236,717 | 8/1993 | Vinci et al. | 426/2 |
| 5,250,307 | 10/1993 | Cummings et al. | 426/72 |
| 5,391,788 | 2/1995 | Vinci | 554/156 |
| 5,405,628 | 4/1995 | Ueda et al. | 426/99 |
| 5,425,963 | 6/1995 | Lajoie | 426/2 |
| 5,496,571 | 3/1996 | Blagdon et al. | 426/2 |
| 5,508,058 | 4/1996 | Endres et al. | 426/635 |
| 5,571,527 | 11/1996 | Nishimura et al. | 424/438 |
| 5,585,134 | 12/1996 | Cummings et al. | 426/630 |
| 5,807,594 | 9/1998 | King et al. | 426/2 |

OTHER PUBLICATIONS

Aliev et al., Tr. Uses. Nauchvo–Issled. Inst. Fiziol., Biolhim. Pitan. S–kh. Zhivotn., vol 17, pp. 34–42, 1977.

T. S. Rumsey, "Effect of Choline in All–concentrate Diets of Feedlot Steers and on Ruminal Acidosis", *Can. J. Anim. Sci.* 65: 135–146 (Mar. 1985).

R.R. Harris, et al., "Effect of Choline in a High–Roughage Steer Fattening Ration", *J. Anim. Sci.* 25: 248 (1996).

T.S. Rumsey et al., "Sulfur and Choline in All–concentrate Beef Finishing Diets", *J. Anim. Sci.* 41: 416 (1975).

I.A. Dyer, "For Fattening Cattle", Anim. Nut & Health, (Oct. 1969).

*Primary Examiner*—Chhaya D. Sayala
*Attorney, Agent, or Firm*—Banner & Witcoff, Ltd.

[57] ABSTRACT

A method of increasing feed intake, feed efficiency, daily gain, carcass grade, or combinations thereof, in ruminants. The ruminants are fed ration containing about 0.1 to 5 wt % added fat; wherein the ration also contains 0.5 to 10 grams of a rumen-protected choline compound for the first 0.1 to 2 wt % added fat and about 2 to 5 additional grams of rumen-protected choline compound for each additional 1% added fat.

14 Claims, No Drawings

METHOD FOR INCREASING THE FEED INTAKE, FEED EFFICIENCY, DAILY GAIN AND/OR CARCASS GRADE IN RUMINANTS

This application is a continuation-in-part application of prior U.S. Provisional Application Ser. No. 60/067,329, filed Dec. 2, 1997, entitled Method for Increasing the Feed Intake, Feed Efficiency, Daily Gain, and/or Carcass Grade in Ruminants.

BACKGROUND OF THE INVENTION

1. Field of the Invention

The present invention relates to a method increasing feed intake, feed efficiency, daily gain, and carcass grade in ruminants by combining a rumen-protected choline compound with ration in an amount proportional to the concentration of added fat in the ration.

2. Description of the Prior Art

Choline is an essential nutrient for ruminants. Normally, choline is provided in adequate quantities as a result of synthesis by ruminal microflora in cattle-feeding programs using primarily forage-based diets. Protozoa appear to be the primary species involved in synthesis of choline. Consequently, diets that result in ruminal conditions which compromise growth and proliferation of protozoa may result in inadequate choline supply to the animal. High-concentrate diets frequently produce ruminal pH in the range of 5.5 to 5.8, which is less than optimal for proliferation of protozoa. Inclusion of fat in the diet may further reduce protozoal populations. This may be the consequence of lower ruminal pH that occurs with fat feeding, or may be due to some direct effect of fat on the protozoa. In any case, diets that induce low protozoa populations may benefit from addition of choline to the diet. Previous research has suggested that choline chloride is extensively degraded in the rumen.

Although "traditional" dogma would suggest that choline is not required for ruminants, several researcher have challenged this notion and examined the effect of choline supplementation to cattle (Rumsey, "Effect of Choline in All-Concentrate Diets of Feedlot Steers and on Ruminal Acidosis" *Canadian Journal of Animal Science* 65:135, 1985). Harris, et al. "Effect of Choline in a High-Roughage Steer Fattening Ration" *Journal of Animal Science*, 25:248, (1966) examined the affect of feeding 5.53 g of unprotected choline per head per day to finishing cattle receiving a high roughage finishing diet containing no additional fat. No significant difference were detected in feed gains, feed efficiencies, carcass grades, fat thickness, rib-eye area, and yield grade, although there was a slight increase in marbling for cattle consuming choline containing diets.

Rumsey et al., "Sulfur and Choline in All Concentrate Beef Finishing Diets" *Journal of Animal Sciences*, 41:416, 1975, fed unprotected choline to finishing cattle receiving a high concentration of grains (75.4% corn, 15% wheat) and observed improvements in feed efficiency and gain when choline was supplemented at 750 ppm. Wise et al., "Effect of Various Levels of Choline on Performance and Carcass Characteristics of Finishing Steers Fed an All-Concentrate Ration" North Carolina Agric. Exp. Sta AnS re. 139, Animal Health Ser. 10:22 (1966).

Rumsey, 1985, fed finishing feedlot cattle diets containing 0, 750, 1500, and 3000 ppm of additional unprotected choline and observed a moderate improvement in feed efficiency of cattle fed 750 ppm., but detriment effects when fed 1500 or 3000 ppm. The diet did not contain additional fat. Rumsey concluded that, "choline supplementation of all-concentrate diets fed to finishing beef steers does not measurably improve feedlot performance and carcass merit or consistently affect Rumania fermentation." Rumsey's data does suggest that choline may affect lipid metabolism similar to that of humans by increasing the ability of the liver to synthesize and enable transport of lipid to tissues.

It is known that pure choline chloride fed to ruminants is broken down in the rumen and is an ineffective treatment. It was then discovered that encapsulated choline could be used to enable the choline chloride to pass through the rumen without breaking down thus allowing absorption in the gut. For example, encapsulated choline has been added to ration for increasing the milk production in dairy cows, as described in U.S. Pat. No. 5,496,571.

Although other uses for rumen-protected choline have been explored, choline has not been successfullly employed as an agent to increase carcass grade, daily gain, feed intake, feed efficiency and/or degree of fattening in ruminants. It would therefore be desirable to provide a method of treatment of ruminants to increase carcass grade, daily gain, feed intake, feed efficiency and/or degree of fattening.

SUMMARY OF THE INVENTION

The present invention is directed to a method of increasing feed intake, feed efficiency, daily gain, carcass grade, or combinations thereof, in ruminants. A rumen-protected choline compound is added to ration in an amount proportional to the concentration of added fat in the ration.

In accordance with the present invention, the ruminants are fed a ration containing about 0.1 to 5 wt % added fat; wherein the ration also contains 0.5 to 10 grams of a rumen-protected choline compound for the first 0.1 to 2 wt % added fat and about 2 to 5 additional grams of rumen-protected choline compound for each additional 1 wt % added fat.

Added fat is fat added to the ration and does not include the fat naturally derived from other ingredients in the ration, such as grains. Added fat can be oils or fats derived from any number of animal or vegetable sources (lard, tallow, soybean oil, and hydrogenated vegetable oils.)

The rumen-protected choline compound protects the choline compound against metabolism by bacteria in the rumen of the ruminant. This allows controlled amounts of the choline compound to be readily absorbed in the digestive track of the animal.

The present invention is particularly directed to beef cattle. By adding fat to a typical ration and then adding a rumen-protected choline compound in an amount proportional to the added fat, beef cattle were found to have improved feed intake, feed efficiency, daily gain, and carcass grade.

DETAILED DESCRIPTION OF THE PREFERRED EMBODIMENTS

The present invention is directed to a method of increasing feed intake, feed efficiency, daily gain, or carcass grade, or combinations thereof, in ruminants. The ruminant may be any ruminant such as beef cattle. The ruminant may also be dairy cattle whereby it is desired that feed intake and feed efficiency are improved. The discussion below is directed to beef cattle. However, the present application is not limited to beef cattle and it is believed that the present invention can be utilized on any ruminant where feed intake, feed efficiency, daily gain, and/or carcass grade are desired.

It was discovered that a improvements could be made in carcass grade, daily gain, feed intake, feed efficiency and degree of fattening in beef cattle by feeding the beef cattle a ration which included rumen-protected choline compound in an amount proportional to the concentration of added fat in the ration. The rumen-protected choline compound allows the choline to survive the rumen where it would otherwise break down rendering the choline useless. The added fat, on the other hand, may be absorbed later in the digestive track. The present invention is based on the unexpected and surprising relationship between the rumen-protected choline compound and added fat in improving growing and finishing performances and carcass characteristics of beef cattle.

The method of the present invention is directed to delivery to a ruminant of ration containing rumen-protected choline and added fat to a ruminant in amounts effective to improve carcass grade, daily gain, feed intake, feed efficiency, and/or degree of fattening, whereby the amount of rumen-protected choline compound is proportional to the amount of added fat in the ration.

The ration may be any suitable ration used to feed ruminants, containing greater than 25% grain (corn, oats, wheat, milo, barley, etc.) The amount of ration depends on the size of the ruminant and is well within the skill of the art. The ration may be administered to ruminants such as growing beef steers or finishing beef steers. Ration typically contains between 2 and 3 wt % fat which is normally derived from the grains. The added fat, in accordance with the present invention, does not include the fat already present in the ration.

The choline compound may be any suitable form of choline. Choline is available in many forms such as choline chloride, choline bitartrate, choline dihydrogencitrate, choline bicarbonate, and choline free base. Choline chloride is preferred.

Any suitable delivery form that protects choline in the rumen and allows it to be readily absorbed in the remainder of the cattle's digestive track, e.g. the abomasum, stomach, and/or gut, is contemplated as being useful in the present invention. That is, any delivery form that protects the choline compound against metabolism by bacteria in the rumen of the ruminant. The delivery form can be, for example, any encapsulated delivery form such as suitable encapsulating compositions described in U.S. Pat. Nos. 4,876,097, 5,190,775, 5,204,029 and 5,496,571, which disclosures are hereby incorporated by reference in their entirety. Suitable protecting or encapsulating means may also include bypass fat, which is fat that bypasses the rumen and thus is not absorbed in the rumen. If encapsulation is used to protect the choline, any of the above forms of choline that are liquids immiscible in the encapsulating media or are readily soluble in a liquid immiscible in the encapsulating media are useful.

Rumen-protected choline is conveniently administered in the normal feed ration and is added to the ration in an amount proportional to the amount of added fat in the feed ration. As the amount of added fat in the ration increases, the amount of rumen-protected choline is also increased. Preferably about 0.5 to 10 grams choline are added to the ration (containing more than 25 wt % grain) when incorporating 0.1 to 2 wt % added fat. For rations including more than 2 wt % added fat, an additional 2 to 5 grams of choline must be added to the ration for each 1 wt % of added fat. The amount of rumen-protected choline added to or supplemented to the ration is based on the amount of choline that can survive the rumen.

The method of the present invention will improve growing and finishing performances and carcass characteristics. Carcass grade is the quality of the meat, for example how tender the meat is and the degree of marbling. Carcass grade is generally designated as good, choice, and prime. Daily gain is the amount of weight that is gained in a single day. Feed intake is the amount of feed eaten in a single day. Feed efficiency is the amount of weight gained based on the amount of feed eaten.

The invention will be further described by reference to the following examples. These examples should not be construed in any way as limiting the invention to anything less than that which is disclosed or which could have been obvious to anyone skilled in the art.

EXAMPLES

Example 1

A performance study was conducted to evaluate finishing performance of cattle fed diets containing dry-rolled corn and alfalfa. Cattle were fed a common diet for several weeks in order to minimize variation in gut fill. Following the transition period, cattle were treated for internal and external parasites and implanted with estradiol/TBA (Synovex® Plus™) which increases lean muscle development. Steers were stratified by weight and randomly assigned, within strats, to eight treatment groups. Treatments were arranged as a $2^3$ factorial, in four replicates, with factors comprised of level of added choice white grease (0 or 5%), dietary protein level of 10.8% or 12.5%, and level of ruminally-protected choline (0 or 5 g/day). The difference between high and low levels of dietary protein was achieved with the addition of urea and corn gluten meal, thus making it possible to alter DIP (1Digestible Intake Protein) levels without substantially affecting the proportion of UIP (Indigestible Intake Protein) in the experimental diets. Ruminally protected choline (Balchem Corporation) was diluted in a premixture with rolled corn to insure uniform distribution in the diets. Composition of experimental diets is shown in Table 1.

TABLE 1

| Composition (100% dry basis) of Experimental Diets | | | | |
|---|---|---|---|---|
| | 10.8% Protein | | 12.5% Protein | |
| Item | 0% Fat | 5% Fat | 0% Fat | 5% Fat |
| Rolled corn, % | 85.30 | 79.36 | 84.69 | 78.74 |
| Ground alfalfa hay, % | 8.0 | 8.0 | 8.0 | 8.0 |
| Choice white grease, % | — | 5.0 | — | 5.0 |
| Car-Mill Glo, % | 3.0 | 3.0 | 3.0 | 3.0 |
| Dehulled soybean meal, % | 1.0 | 1.0 | 1.0 | 1.0 |
| Corn gluten meal, % | — | .9 | — | .9 |
| Urea, % | .09 | .09 | .70 | .70 |
| Limestone, % | 1.55 | 1.55 | 1.55 | 1.55 |
| Potassium chloride, % | .40 | .43 | .40 | .44 |
| Salt, % | .3 | .3 | .3 | .3 |
| Magnesium oxide, % | .11 | .12 | .11 | .12 |
| Ammonium sulfate, % | .1 | .1 | .1 | .1 |
| Vitamin/mineral premixes, % | .15 | .15 | .15 | .15 |
| Ruminally-protected choline, g/head/d | 0 or 5 | 0 or 5 | 0 or 5 | 0 or 5 |
| Crude protein, % | 10.8 | 10.8 | 12.5 | 12.5 |
| NPN, % | .40 | .40 | 2.17 | 2.17 |
| Crude Fat, % | 4.09 | 8.84 | 4.06 | 8.81 |
| Nem, Mcal/lb | .84 | .91 | .84 | .90 |
| Neg, Mcal/lb | .55 | .60 | .54 | .59 |
| Calcium, % | .75 | .75 | .75 | .75 |
| Phosphorus, % | .32 | .31 | .30 | .30 |
| Potassium, % | .75 | .75 | .75 | .75 |

TABLE 1-continued

Composition (100% dry basis) of Experimental Diets

|  | 10.8% Protein | | 12.5% Protein | |
| --- | --- | --- | --- | --- |
| Item | 0% Fat | 5% Fat | 0% Fat | 5% Fat |
| Magnesium, % | .25 | .25 | .25 | .25 |
| Sulfur, % | .17 | .17 | .17 | .17 |
| Rumensin, g/ton | 30 | 30 | 30 | 30 |
| Tylan, g/ton | 10 | 10 | 10 | 10 |

Diets contain the following dry matter concentrations of added vitamins and trace minerals:
1,200 IU/lb vitamin A;
10 IU/lb vitamin E;
.05 ppm cobalt;
10 ppm copper;
.6 ppm iodine;
60 ppm manganese;
.25 ppm selenium;
60 ppm zinc.

Cattle were housed in partially covered, 14'×28' pens with concrete surfaces, and fed once per day. The proportion of concentrate (grain mix) in the experimental diets was incrementally increased from 40 to 92% by feeding each of five step-up diets for a period of two to six days until achieving a final forage:concentrate ratio of 8:92 (92% grain, 8% other ingredients, usually nutritional supplements). Experimental diets were provided over a period of 89 days.

Feed consumption, weight gain and feed conversion were measured for each pen of cattle. Steers were slaughtered when they achieved an estimated outside fat thickness (12th rib) of 0.4 inches. Slaughter characteristics, including incidence of liver abscesses, hot carcass weight, ribeye area, fat thickness over 12th rib, KPH, marbling score, quality grade, and yield grade, were evaluated. Daily gain and efficiency were determined by calculating final live weight as hot carcass weight divided by a common dressing percentage. Data were analyzed by regression using the General Linear Models procedure of S.A.S., using choline level as the sole continuous effect. The statistical model included fixed effects of feeding location, protein level, fat level, choline level, and protein X fat, and fat X choline interactions. Additionally, daily gain during the pretrial period was included in the model as a continuous variable (covariate).

Table 2 summarizes the effects of added choice white grease and dietary protein level on performance and carcass characteristics of steers fed in Trial 1.

TABLE 2

Effects of Added Fat and Protein Level on Finishing
Performance and Carcass Characteristics (Trial 1)

|  | 0% Added Fat | | 5% Added Fat | |
| --- | --- | --- | --- | --- |
| Item | 10.8% CP | 12.5% CP | 10.8% CP | 12.5% CP |
| Number of head | 40 | 39 | 40 | 40 |
| Initial weight, lb | 895 | 899 | 894 | 899 |
| Final live weight, lb | 1196 | 1212 | 1185 | 1188 |
| Gain, lb/day[a,c] | 3.48 | 3.46 | 3.22 | 3.27 |
| Dry matter intake, lb/day[b] | 22.2 | 22.7 | 20.9 | 21.1 |
| Gain:Feed | .158 | .152 | .154 | .156 |
| Liver abscesses, % | 4.7 | 2.7 | 11.8 | 8.3 |
| Hot Carcass Weight, lb | 728 | 729 | 713 | 719 |
| Dressing percentage | 61.2 | 60.1 | 60.2 | 60.5 |
| Kidney, pelvic and heart fat | 2.2 | 2.3 | 2.2 | 2.2 |
| 12th rib fat thickness, in | .40 | .45 | .46 | .47 |
| Ribeye area, in$^2$ | 13.5 | 13.3 | 13.3 | 13.0 |
| USDA Yield Grade | 1.7 | 1.9 | 2.1 | 2.0 |
| USDA Choice, % | 50 | 69 | 39 | 59 |

[a]Effect of added fat (P < .1)
[b]Effect of added fat (P < .01)
[c]0% fat greater than 5% fat (P < .1)
[d,e]Means in the same row with common superscripts are not different (P > .1)

There were no significant interactions between dietary levels of protein and added fat. Similarly, the main effect of protein did not influence most performance of carcass traits, though there was a tendency to improve carcass grade with higher levels of protein (P=0.13). Adding choice white grease to the diet depressed feed intake (P<0.01). Additionally, gains of cattle fed 5% choice white grease were less (P<0.1) than those of cattle fed the control diet, though efficiency was not significantly different. These data suggest that the low level of protein was sufficient for all diets.

Interactions between choline and fat, and their influence on performance and carcass traits of steers, are shown in Table 3.

TABLE 3

Effects of Added Fat and Protected Choline on
Finishing Performance and Carcass
Characteristics (Trial 1)

|  | 0% Added Fat | | 5% Added Fat | |
| --- | --- | --- | --- | --- |
| Item | 0 g/d Choline | 5 g/d Choline | 0 g/d Choline | 5 g/d Choline |
| Number of head | 40 | 39 | 40 | 40 |
| Initial weight, lb | 901 | 893 | 896 | 896 |
| Final live weight, lb | 1200 | 1212 | 1179 | 1191 |
| Gain, lb/day[a] | 3.36[g,h] | 3.58[g] | 3.18[h] | 3.32[g,h] |
| Dry matter intake, lb/day[c] | 23.1[g] | 21.9[h] | 20.6[i] | 21.4[h,i] |
| Gain:Feed[f] | .146[g] | .164[h] | .155[g,h] | .155[g,h] |
| Liver abscesses, % | 4.9 | 2.5 | 5.3 | 14.8 |
| Hot Carcass Weight, lb | 125 | 732 | 713 | 720 |
| Dressing percentage[b,c] | 59.98 | 61.5[h] | 60.3[g] | 60.4[g] |
| 12th rib fat thickness, in | .46 | .39 | .43 | .50 |
| Kidney, pelvic and heart fat | 2.2 | 2.3 | 2.2 | 2.2 |
| Ribeye area, in$^2$ | 13.3 | 13.6 | 12.8 | 12.4 |
| USDA Yield Grade[a,c] | 1.9[g,h] | 1.7[h] | 1.9[g,h] | 2.1[g] |
| USDA Choice, % | 52 | 67 | 48 | 51 |

[a]Effect of added fat (P < .1)
[b]Effect of added choline (P < .1)
[c]Fat by choline interaction (P < .1)
[d]Effect of added fat (P < .01)
[e]Fat by choline interaction (P < .05)
[f]Effect of added choline (P = 0.1)
[g,h,i]Means in the same row with common superscripts are not different (P > .1)

Dietary levels of fat or choline did not influence final live weight, but did affect dressing percentage. The addition of choline significantly increased dressing percentage (59.9 vs. 61.5% for 0 and 5 g/day, respectively). The effect of choline on dressing percentage was far more pronounced when fat was not included in the diet, indicating a significant interaction between levels of added fat and choline (P<0.1). The addition of choice white grease depressed rate of gain (P<0.1), but there was a tendency to alleviate this effect with the addition of choline to the diet (P=0.15). These differences appear to have been driven by differences in dry matter intake, which followed a very similar pattern. Dry matter intake (pounds of feed eaten per day excluding water content) was reduced with the addition of choline when fat was not included in the diet, but intake was maintained at a relatively constant level when choice white grease was added to the daily ration. Adding choline to the diet tended to improve feed efficiency when fat was not added to the diet (P=0.13). Yield grade also was impacted by the interaction between choline and fat (P<0.1). Other measures of carcass fatness followed similar trends, but were not significant. These data suggest that cattle fed supplemental choline may require fewer days on feed in order to reach a common compositional endpoint when utilized in diets containing fat.

Example 2

A performance study was conducted to evaluate finishing performance of cattle fed diets containing dry-rolled corn and alfalfa. Cattle were fed a common diet for several weeks in order to minimize variation in gut fill. Following the transition period, cattle were treated for internal and external parasites and implanted with estradiol/TMA (Synovex® Plus™). Steers were stratified by weight and randomly assigned, within strats, to eight treatment groups. Ruminally protected choline (Balchem Corporation) was diluted in a premixture with rolled corn to insure uniform distribution in the diets. Composition of experimental diets is shown in Table 1. Cattle were housed in partially covered, 14'×28' pens with concrete surfaces, and fed once per day. The proportion of concentrate in the experimental diets was incrementally increased from 40 to 92% by feeding each of five step-up diets for a period of two to six days until achieving a final forage:concentrate ratio of 8:92. Experimental diets were provided over a period of 89 days.

A dose-titration experiment was conducted concurrently with Example 1 to determine the optimum inclusion level for ruminally protected choline. Cattle were adapted to high grain diets, processed, and allocated to treatments in a manner identical to that used for Example 1. Treatments were composed of increasing levels of ruminally-protected choline. The high-fat, high protein diet from Example 1 was top dressed with 0, 2, 3, 4, 6, 7, 8, or 9 grams per head daily of choline as a fat-encapsulated product (60% fat, 24% choline). A total of four pens were fed the control diet (no added choline). A single pen of cattle was allotted to each level of added choline, providing 2, 3, 4, 6, 7, 8, or 9 g/day of protected choline. Feed consumption, weight gain and feed conversion were measured as in example 1 for each pen of cattle.

Results are summarized in Table 4.

TABLE 4

Effects of Increasing Levels of Ruminally Protected Choline on Finishing Performance and Carcass Characteristics of Steers (Trial 2)

| Item | Intercept | Estimate | Significance (P) |
| --- | --- | --- | --- |
| Number of head | 60 | | |
| Initial weight, lb | 882 | .3 | .89 |
| Final live weight, lb | 1173 | 6.7 | .03 |
| Gain, lb/day | 3.30 | .09 | .01 |

TABLE 4-continued

Effects of Increasing Levels of Ruminally Protected Choline on Finishing Performance and Carcass Characteristics of Steers (Trial 2)

| Item | Intercept | Estimate | Significance (P) |
| --- | --- | --- | --- |
| Dry matter intake, lb/day | 20.20 | .33 | .03 |
| Gain:Feed | .163 | .002 | .25 |
| Liver abscesses, % | .17 | .98 | .20 |
| Hot Carcass Weight, lb | 710.2 | 4.8 | .01 |
| Dressing percentage | 60.52 | .07 | .22 |
| 12th rib fat thickness, in | .39 | .02 | .01 |
| Kidney, pelvic and heart fat | 2.12 | .05 | .02 |
| Ribeye area, in$^2$ | 13.25 | −.002 | .98 |
| USDA Yield Grade | 1.76 | .06 | .02 |
| USDA Choice, % | 49.1 | 1.0 | .57 |

Intercept is the baseline based on the control diet. Estimate is the slope of the line indicating benefit of each listed variable per gram of choline provided. For example, adding 1 g of choline provided 6.7 lbs live weight.

Each gram of added choline resulted in an increase in feed intake of 0.33 pounds per head daily, and a concomitant increase in gain of 0.09 pounds per head daily. Carcass weights were increased by nearly 5 pounds per gram of added choline. All measures of body fatness tend to support the suggestion that increasing the level of protected choline in the diet may reduce days required to achieve a desired composition endpoint. These data may suggest a higher requirement for supplemental choline in the presence of added fat, which may have impacted the outcome of Example 1. This is consistent with the suggestion that protozoa are negatively impacted by addition of fat to the diet.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

I claim:

1. A method of increasing feed intake, feed efficiency, daily gain, carcass grade, or combinations thereof, in ruminants, comprising:
   feeding ration to the ruminants, wherein said ration containing about 0.1 to 5 wt % fat added to increase the fat in the ration; wherein the ration also contains 0.5 to 10 grams of a rumen-protected choline compound for the first 0.1 to 2 wt % added fat and about 2 to 5 additional grams of rumen-protected choline compound for each additional 1 wt % added fat.

2. The method of claim 1 wherein said ration contains about 0.25 to 4 wt % added fat.

3. The method of claim 2 wherein said ration contains about 1 to 2 wt % added fat.

4. The method of claim 1 wherein the choline compound is selected from the group consisting of choline chloride, choline bitartrate, choline dihydrogencitrate, choline bicarbonate, and choline free base.

5. The method of claim 4 wherein the choline compound is choline chloride.

6. The method of claim 1 wherein the rumen-protected choline compound is an encapsulated choline compound.

7. The method of claim 1 wherein the added fat is selected from the group consisting of lard, tallow, soybean oil, and hydrogenated vegetable oils.

8. A method of increasing feed intake, feed efficiency, daily gain, carcass grade, or combinations thereof, in beef cattle, comprising:

feeding ration to the beef cattle, wherein said ration containing about 0.1 to 5 wt % fat added to increase the fat in the ration; wherein the ration also contains 0.5 to 10 grams of a rumen-protected choline compound for the first 0.1 to 2 wt % added fat and about 2 to 5 additional grams of rumen-protected choline compound for each additional 1 wt % added fat.

9. The method of claim 8 wherein said ration contains about 0.25 to 4 wt % added fat.

10. The method of claim 9 wherein said ration contains about 1 to 2 wt % added fat.

11. The method of claim 8 wherein the choline compound is selected from the group consisting of choline chloride, choline bitartrate, choline dihydrogencitrate, choline bicarbonate, and choline free base.

12. The method of claim 11 wherein the choline compound is choline chloride.

13. The method of claim 8 wherein the rumen-protected choline compound is an encapsulated choline compound.

14. The method of claim 8 wherein the added fat is selected from the group consisting of lard, tallow, soybean oil, and hydrogenated vegetable oils.

* * * * *

Disclaimer 6,022,566—Bryan G. Miller, Pine Bush, N.Y.(US) METHOD FOR INCREASING THE FEED INTAKE, FEED EFFICIENCY, DAILY GAIN AND/OR CARCASS GRADE IN RUMINANTS. Patent dated Feb. 8, 2000. Disclaimer filed Apr. 15, 2004, by the assignee, Balchem Corp.

Hereby enters this disclaimer to claims 1-14 of said patent.

*(Official Gazette March 15, 2005)*